Figures 1, 2:
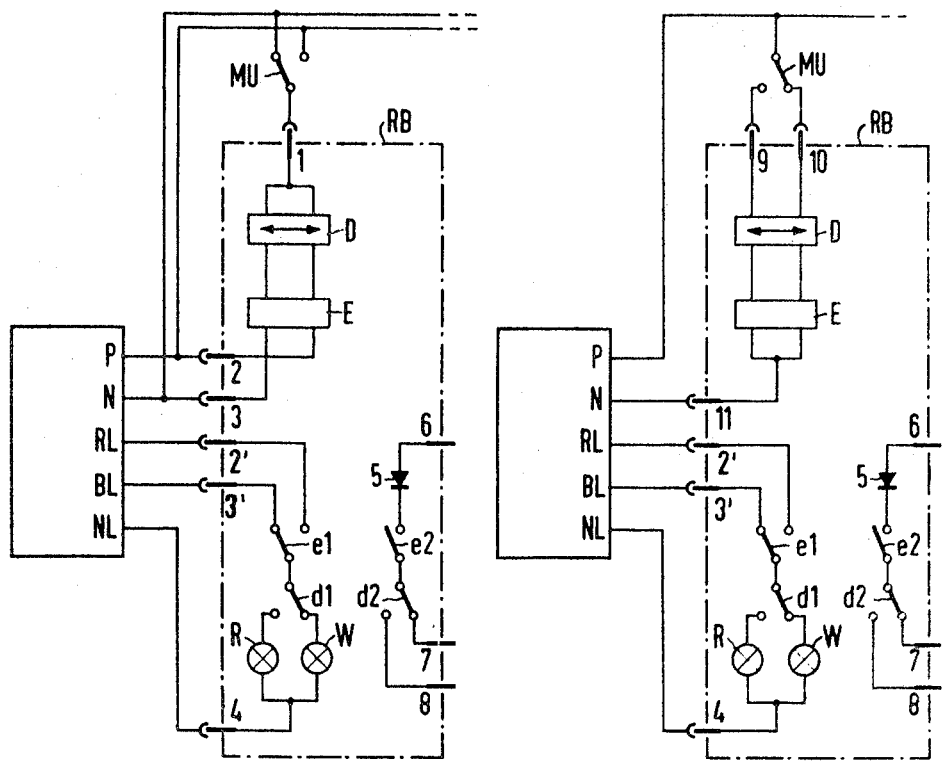

United States Patent

[11] 3,594,776

| [72] | Inventor | Otto Wildgruber<br>Erlangen, Germany |
|---|---|---|
| [21] | Appl. No. | 873,948 |
| [22] | Filed | Nov. 4, 1969 |
| [45] | Patented | July 20, 1971 |
| [73] | Assignee | Siemens Aktiengesellschaft<br>Berlin, Munich, Germany |
| [32] | Priority | Nov. 22, 1968 |
| [33] | | Germany |
| [31] | | P 18 10 350.9 |

[54] VISUAL POSITION INDICATING CIRCUIT FOR SWITCHING EQUIPMENT
3 Claims, 2 Drawing Figs.

[52] U.S. Cl. ........................................... 340/332,
340/252 R
[51] Int. Cl. ........................................... G08b 5/36
[50] Field of Search .......................................... 340/252 R,
324 R, 332, 378 R; 317/157; 324/51, 76, 133

[56] References Cited
UNITED STATES PATENTS

| 2,250,214 | 7/1941 | Ashworth | 340/252 |
|---|---|---|---|
| 2,648,728 | 8/1953 | Bollhoefer | 340/332 |
| 3,147,466 | 9/1964 | Stacy | 340/252 |

Primary Examiner—Robert L. Griffin
Assistant Examiner—George G. Stellar
Attorneys—Curt M. Avery, Arthur E. Wilfond, Herbert L. Lerner and Daniel J. Tick

ABSTRACT: In one condition of switching equipment a pair of relays closes a circuit for intermittent energization of a colored pilot lamp. In another condition of switching equipment, the pair of relays closes a circuit for continuous energization of another pilot lamp of a different color.

VISUAL POSITION INDICATING CIRCUIT FOR SWITCHING EQUIPMENT

DESCRIPTION OF THE INVENTION

The invention relates to a visual position indicating circuit. More particularly, the invention relates to a visual position indicating circuit for switching equipment.

In check back position indicating systems for switching equipment such as, for example, disconnect switches, power circuit breakers, or the like, it is known to utilize visual and audible signal modules which are controlled in operation by a pilot or indicating switch which indicates the switching position of the switching equipment.

It is known to connect the pilot or indicating lamps for the visual indication of the position of the pilot or indicating switch in a manner whereby if there is difficulty such as, for example, the failure of the switching equipment to attain clear closing position during a switching operation, the assigned pilot switch is utilized to connect the corresponding pilot lamp to an intermittent energizing voltage source so that the difficulty or failure is indicated by an intermittently energized lamp or blinking light. In control boards or switchboards, the intermittent light indication is also utilized for the prechecking of desired switch operations.

A particularly clear indication of the switching position of a switching device is provided by the utilization of two pilot or indicating lamps having different colors for indicating each switching position. One of the lamps is connected to a source of constant or continuous energizing voltage in accordance with the position or condition of the switching equipment, and the other of the lamps is connected to a source of intermittent energizing voltage in accordance with the position or condition of the switching equipment.

The invention relates to this type of visual position indicating circuit for the switching equipment. The indicating circuit has at least one pilot or indicating switch which does not reach either of its end or closed positions when the switching equipment is defective, in fault, in failure, or the like. The position indicating circuit of the invention includes two pilot or indicating lamps, each of a different color.

The principal object of the invention is to provide a new and improved visual position indicating circuit for switching equipment.

An object of the invention is to provide a visual position indicating circuit for switching equipment, which indicating circuit is of simple structure.

An object of the invention is to provide a visual position indicating circuit for switching equipment, which indicating circuit is efficient, effective, accurate and reliable in operation.

An object of the invention is to provide a visual position indicating circuit for switching equipment, which indicating circuit provides a clear and readily interpretable indication of the condition or position of switching equipment.

In accordance with the invention, a visual position indicating circuit or switching equipment comprises a source of DC energizing voltage having a positive polarity terminal and a negative polarity terminal. A first relay has a pair of windings and a relay switch contact controlled in position by the windings. The relay switch contact has two closed positions and the first relay has two stable conditions. A second relay has winding means connected in series with the first relay and has a relay switch contact controlled in position by the winding means. The relay switch contact has two closed positions. A pilot switch has two closed positions connected between the source of DC energizing voltage and the series-connected first and second relays. A source of intermittent energizing voltage is provided. A first pilot lamp of a first color has a pair of terminals. A second pilot lamp of a second color has a pair of terminals. A common terminal is connected in common to a corresponding terminal of each of the first and second lamps. A circuit connects the relay switch contact of the first relay and the relay switch contact of the second relay in series between the sources of intermittent and constant energizing voltage and the other terminal of each of the first and second lamps in a manner whereby when the relay switch contact of the first relay is in a first closed position and the relay switch contact of the second relay is in a first closed position the relay switch contacts provide a current path from the source of intermittent energizing voltage to the second pilot lamp thereby intermittently energizing the second pilot lamp. When the relay switch contact of the first relay is in a second closed position and the relay switch contact of the second relay is in a second closed position the relay switch contacts provide a current path from the source of constant energizing voltage to the first pilot lamp thereby continuously energizing the first pilot lamp.

In one embodiment of the invention the pilot switch has a fixed contact connected in common to a corresponding end of each winding of the first relay. When the pilot switch is in a first closed position it connects the first relay to the negative polarity terminal of the source of DC energizing voltage and when the pilot switch is in a second closed position it connects the second relay to the positive polarity terminal of the source of DC energizing voltage. The other ends of the winding means of the second relay are connected to the negative and positive polarity terminals of the source of DC energizing voltage.

In another embodiment of the invention, the pilot switch has a fixed contact connected to the positive polarity terminal of the source of DC energizing voltage. When the pilot switch is in a first closed position it connects the positive polarity terminal to one end of one of the windings of the first relay and when the pilot switch is in a second closed position it connects the positive polarity terminal to a corresponding end of the other of the windings of the first relay. The other ends of the winding mans of the second relay are connected in common to the negative polarity terminal of the source of DC energizing voltage.

In order that the invention may be readily carried into effect, it will now be described with reference to the accompanying drawing, wherein:

FIG. 1 is a circuit diagram of an embodiment of the visual position indicating circuit of the invention; and FIG. 2 is a circuit diagram of another embodiment of the visual position indicating circuit of the invention.

In the FIGS., the same components are identified by the same reference numerals.

In FIG. 1, the two closed position contacts of a pilot or indicating switch MU are connected to the negative and positive polarity terminals N and P, respectively, of a source of DC energizing voltage. The fixed contact of the pilot switch is connected to an input terminal 1 of a check back module RB. The pilot switch MU has two closed or end positions.

The input terminal 1 of the module RB is connected in common to a corresponding end of each of a pair of oppositely connected windings of a first relay D. The first relay D has two stable conditions or end positions. A second relay E has a pair of oppositely connected windings which are connected in series with the windings of the first relay D. The second relay E has only one stable condition or end position and is switched to its energized or operative condition when one of its two windings is energized or excited.

The other end of one of the windings of the second relay E is connected via an input terminal 3 of the module RB to the negative polarity terminal N of the source of DC energizing voltage. The other end of the other winding of the second relay E is connected via an input terminal 2 of the module RB to the positive polarity terminal P of the source of DC energizing voltage. The first relay D controls and positions two relay switch contacts $d1$ and $d2$. Each of the relay switch contacts $d1$ and $d2$ has two closed positions. The second relay E controls and positions two relay switch contacts $e1$ and $e2$.

One free contact of the first relay switch contact $e1$ is connected to a source of intermittent energizing voltage BL via an input terminal 3'. The other free contact of the first relay switch contact $e1$ is connected to a source of constant energizing voltage RL via an input terminal 2' of the module RB. The fixed contact of the first relay switch contact e1 is directly connected to the fixed contact of the first relay switch contact d1. One free contact of the first relay switch contact d1 is directly connected to one end or terminal of a first pilot or indicating lamp R. The other free contact of the first relay switch contact d1 is directly connected to one end or terminal of a second pilot or indicating lamp W. The other end or terminal of each of the first and second lamps R and W is connected in common with the other and the common connection is connected to a common terminal NL via an input terminal 4 of the module RB.

The first pilot or indicating lamp R is of one color such as, for example, red, and the second pilot or indicating lamp W is of another color such as, for example, white. The common terminal NL is a common second terminal for each of the intermittent energizing voltage source BL and the constant energizing voltage source RL.

The second relay switch contact e2 of the second relay E has a closed position and an open position. The second relay switch contact d2 of the first relay D has two closed positions. The fixed contact of the second relay switch contact e2 is directly connected to the fixed contact of the second relay switch contact d2. The free contact of the second relay switch contact e2 is connected to an output terminal 6 of the module RB via a diode 5. One free contact of the second relay switch contact d2 is directly connected to an output terminal 7 of the module RB and the other free contact of said relay switch contact is directly connected to an output terminal 8 of said module.

The visual position indicating circuit of the invention operates in the following manner. In accordance with the position of the pilot or indicating switch MU, a positive or negative voltage is applied to the input terminal 1 of the module RB, so that one winding of each of the first and second relays D and E, respectively, is energized or excited. Since the first relay D has two stable positions, it is in one of its switching positions or conditions in accordance with the position of the pilot switch MU. Thus, in accordance with the position of the pilot switch MU, the first pilot lamp R or the second pilot lamp W is energized. Since the second relay E is energized in both positions of the pilot switch MU, the first relay switch contact e1 of said second relay is switched to its closed position opposite that shown in FIG. 1. Thus, in accordance with the switch position of the pilot switch MU, one of the first and second pilot lamps R and W is energized with a constant or continuous voltage and is thus continuously lighted.

When the switching equipment has a fault, failure, or the like, or when a switching operation is in preparation, so that the pilot switch MU is not in either of its closed positions, but is, rather, in an intermediate or open position, there is no voltage applied to the input terminal 1 of the check back module RB. The second relay E is thus deenergized. The first relay D remains in its last switching position or condition. Consequently, whichever of the first and second pilot lamps R and W was continuously energized continues to be energized. Due to the deenergization of the second relay E, however, the first relay switch contact e1 of said second relay is switched to its other closed position, as shown in FIG. 1, and the lamp which was formerly continuously energized is then intermittently energized via the source BL of intermittent energizing voltage. The pilot lamp which was formerly continuously lighted then begins to blink or light intermittently.

The visual position indicating circuit of my invention thus provides the advantage that each of the available switching positions of the pilot switch MU or of the switching equipment is indicated by a pilot lamp which lights with a specific color and also provides the advantage that a fault or failure is indicated by a variation from a steady, constant or continuous light to a blinking or intermittent light. Furthermore, the color of the pilot lamp which links or lights intermittently during the fault condition indicates the last switching position prior to the fault.

The diode 5, which is in series connection with the second relay switch contacts e2 and d2 permits a positive potential to be provided at one of the output terminals 7 and 8 of the check back module RB when a positive potential is applied to the output terminal 6 of said module, in accordance with the switching position of the pilot switch MU. The potential at the output terminals 6, 7 and 8 may be utilized to provide additional signals at different points, or may be combined into group signals.

In the embodiment of FIG. 2, the fixed contact of the pilot or indicating switch MU is connected to the positive polarity terminal P of the DC energizing voltage source. One free contact of the pilot switch MU is connected via an input terminal 9 of the module RB to one end of one of the windings of the first relay D. The other free contact of the pilot switch MU is connected via an input terminal 10 of the module RB to one end of the other winding of the first relay D. The windings of the first and second relays D and E are connected in series with each other, as in the embodiment of FIG. 1. The other ends of the windings of the second relay E are connected in common, via an output terminal 11 of the module RB, to the negative polarity terminal N of the source of DC energizing voltage.

The relay switch contacts d1, d2, e1 and e2 are controlled or positioned in the same manner as in the embodiment of FIG. 1. The embodiment of FIG. 2 functions in the same manner as the embodiment of FIG. 1. The first relay D is switched to one of its end positions or conditions in accordance with the position of the pilot switch MU. The second relay E is deenergized for as long as the pilot switch MU is in an open position, indicating a fault in the switching equipment.

While the invention has been described by means of specific examples and in specific embodiments, I do not wish to be limited thereto, for obvious modifications will occur to those skilled in the art without departing from the spirit and scope of the invention.

I claim:

1. A visual position indicating circuit for switching equipment, said position indicating circuit comprising
    a source of DC energizing voltage having a positive polarity terminal and a negative polarity terminal;
    a first relay having a pair of windings and a first relay switch contact controlled in position by said windings, said first relay switch contact having two closed positions, said first relay having two stable conditions;
    a second relay having winding means connected in series with said first relay and having a second relay switch contact controlled in position by said winding means, said second relay switch contact having two closed positions;
    a pilot switch having two closed positions connected between said source of DC energizing voltage and the series-connected first and second relays;
    a source of intermittent energizing voltage;
    a source of constant energizing voltage;
    a first pilot lamp of a first color having a pair of terminals;
    a second pilot lamp of a second color having a pair of terminals;
    a common terminal connected in common to a corresponding terminal of each of said first and second lamps; and
    circuit means connecting the relay switch contact of said first relay and the relay switch contact of said second relay in series between said sources of intermittent and constant energizing voltage and the other terminal of each of said first and second lamps in a manner whereby when the relay switch contact of said first relay is in a first closed position and the relay switch contact of said second relay is in a first closed position said relay switch contacts provide a current path from said source of intermittent energizing voltage to said second pilot lamp thereby intermittently energizing said second pilot lamp and when the relay switch contact of said first relay is in a second closed position and the relay switch contact of said second relay is in a second closed position said relay switch contacts provide a current path from said source of constant energizing voltage to said first pilot lamp thereby continuously energizing said first pilot lamp.

2. A position indicating circuit as claimed in claim 1, wherein said pilot switch has a fixed contact connected in common to a corresponding end of each winding of said first relay, and when said pilot switch is in a first closed position it connects said first relay to the negative polarity terminal of said source of DC energizing voltage and when said pilot switch is in a first closed position it connects said second relay to the positive polarity terminal of said source of DC energizing voltage, the other ends of the winding means of said second relay being connected to the negative and positive polarity terminals of said source of DC energizing voltage.

3. A position indicating circuit as claimed in claim 1, wherein said pilot switch has a fixed contact connected to the positive polarity terminal of said source of DC energizing voltage, and when said pilot switch is in a first closed position it connects said positive polarity terminal to one end of one of the windings of said first relay and when said pilot switch is in a second closed position it connects said positive polarity terminal to a corresponding end of the other of the windings of said first relay, the other ends of the winding means of said second relay being connected in common to the negative polarity terminal of said source of DC energizing voltage.